United States Patent
Lee et al.

(10) Patent No.: US 11,967,734 B2
(45) Date of Patent: Apr. 23, 2024

(54) ELECTRODE ASSEMBLY, SECONDARY BATTERY COMPRISING THE SAME, METHOD FOR MANUFACTURING SECONDARY BATTERY, AND BATTERY PACK

(71) Applicant: LG CHEM, LTD., Seoul (KR)

(72) Inventors: Kwan Bo Lee, Daejeon (KR); Chang Bum Ahn, Daejeon (KR); Seung Ho Na, Daejeon (KR); Su Ho Lee, Daejeon (KR); Hak Soo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 221 days.

(21) Appl. No.: 16/978,492

(22) PCT Filed: Nov. 27, 2019

(86) PCT No.: PCT/KR2019/016476
§ 371 (c)(1),
(2) Date: Sep. 4, 2020

(87) PCT Pub. No.: WO2020/153594
PCT Pub. Date: Jul. 30, 2020

(65) Prior Publication Data
US 2021/0013475 A1  Jan. 14, 2021

(30) Foreign Application Priority Data

Jan. 22, 2019 (KR) .......................... 10-2019-0008258

(51) Int. Cl.
*H01M 50/46* (2021.01)
*H01M 10/04* (2006.01)
(Continued)

(52) U.S. Cl.
CPC ..... *H01M 50/461* (2021.01); *H01M 10/0413* (2013.01); *H01M 10/0459* (2013.01);
(Continued)

(58) Field of Classification Search
CPC ........... H01M 50/461; H01M 10/0459; H01M 50/411; H01M 50/24; H01M 10/0413;
(Continued)

(56) References Cited

U.S. PATENT DOCUMENTS

2001/0041289 A1* 11/2001 Hikmet ............... H01M 10/052
429/246
2005/0202311 A1* 9/2005 Higashino ........... H01M 10/625
429/158

(Continued)

FOREIGN PATENT DOCUMENTS

CN 1667851 A 9/2005
CN 103597627 A 2/2014
(Continued)

OTHER PUBLICATIONS

English machine translation of Woo et al. (KR-20160121105-A) description. Foreign patent cited in IDS filed Sep. 4, 2020. (Year: 2016).*

(Continued)

*Primary Examiner* — Matthew T Martin
*Assistant Examiner* — Jessie Walls-Murray
(74) *Attorney, Agent, or Firm* — Birch, Stewart, Kolasch & Birch, LLP

(57) ABSTRACT

An electrode assembly includes a radical unit in which electrodes and separators are alternately stacked, the radical unit having a structure in which one electrode is stacked at the uppermost end. An auxiliary unit is provided with a separation sheet disposed at the uppermost end side of the radical unit. The separation sheet includes a separation part (Continued)

disposed at the uppermost end side of the radical unit and a side surface protection part connected to each of side surfaces of the separation part and folded to contact a side portion of the radical unit to cover the side portion of the radical unit.

15 Claims, 13 Drawing Sheets

(51) Int. Cl.
*H01M 50/414* (2021.01)
*H01M 50/466* (2021.01)
*H01M 50/474* (2021.01)

(52) U.S. Cl.
CPC ..... *H01M 10/0468* (2013.01); *H01M 50/414* (2021.01); *H01M 50/466* (2021.01); *H01M 50/474* (2021.01)

(58) Field of Classification Search
CPC .......... H01M 10/0468; H01M 50/414; H01M 50/466; H01M 50/474
See application file for complete search history.

(56) References Cited

U.S. PATENT DOCUMENTS

| | | | |
|---|---|---|---|
| 2007/0154790 A1 | 7/2007 | Jeung et al. | |
| 2011/0086265 A1* | 4/2011 | Suzuki | H01M 50/60 429/186 |
| 2011/0195299 A1* | 8/2011 | Hashimoto | H01M 10/0468 429/153 |
| 2012/0202105 A1* | 8/2012 | Shinyashiki | H01M 10/052 429/153 |
| 2012/0247107 A1* | 10/2012 | Balk | H01M 50/224 429/100 |
| 2013/0284531 A1 | 10/2013 | Oonuma et al. | |
| 2014/0272507 A1* | 9/2014 | Ku | H01M 10/0413 429/94 |
| 2014/0370362 A1* | 12/2014 | Park | H01M 10/0436 429/152 |
| 2015/0340729 A1* | 11/2015 | Ko | H01M 10/0413 29/623.3 |
| 2018/0090795 A1 | 3/2018 | Yu et al. | |
| 2018/0131031 A1* | 5/2018 | Ku | H01M 10/0431 |
| 2018/0159104 A1* | 6/2018 | Lee | H01M 50/461 |
| 2018/0261874 A1 | 9/2018 | Ko et al. | |
| 2019/0051924 A1 | 2/2019 | Kim et al. | |

FOREIGN PATENT DOCUMENTS

| | | |
|---|---|---|
| CN | 104054205 A | 9/2014 |
| CN | 104541399 A | 4/2015 |
| EP | 2750234 A1 | 7/2014 |
| EP | 2883466 A1 | 4/2015 |
| JP | 2002-324571 A | 11/2002 |
| JP | 2014-11115 A | 1/2014 |
| JP | 2017-162767 A | 9/2017 |
| KR | 10-2007-0073169 A | 7/2007 |
| KR | 10-2014-0003428 A | 1/2014 |
| KR | 10-2014-0103087 A | 8/2014 |
| KR | 10-2015-0036926 A | 4/2015 |
| KR | 10-2016-0121105 A | 10/2016 |
| KR | 10-2016-0139413 A | 12/2016 |
| KR | 10-2017-0124336 A | 11/2017 |
| KR | 10-2017-0138636 A | 12/2017 |
| KR | 10-2018-0035510 A | 4/2018 |

OTHER PUBLICATIONS

Extended European Search Report, dated Apr. 22, 2021, for European Application No. 19910955.4.
International Search Report issued in PCT/KR2019/016476 (PCT/ISA/210), dated Mar. 9, 2020.

* cited by examiner

ELECTRODE ASSEMBLY, SECONDARY BATTERY COMPRISING THE SAME, METHOD FOR MANUFACTURING SECONDARY BATTERY, AND BATTERY PACK

CROSS-REFERENCE TO RELATED APPLICATION

The present application claims the benefit of the priority of Korean Patent Application No. 10-2019-0008258, filed on Jan. 22, 2019, which is hereby incorporated by reference in its entirety.

TECHNICAL FIELD

The present invention relates to an electrode assembly, a secondary battery comprising the electrode assembly, a method for manufacturing the secondary battery, and a battery pack, and more particularly, to an electrode assembly having a structure for blocking introduction of foreign substances into side surfaces, a secondary battery comprising the electrode assembly, a method for manufacturing the secondary battery, and a battery pack.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries may be variously classified according to a structure of the electrode assembly. For example, the secondary batteries may be classified into a stacking type structure, a jelly-roll-type structure, or a stacking/folding type structure.

The stacking type secondary battery comprises an electrode assembly and a pouch that accommodates the electrode assembly, and the electrode assembly has a structure in which an electrode and a separator are separately stacked. Also, a lamination process is performed on the electrode assembly having the stacked structure as described above to improve bonding force.

However, in a transfer step of the lamination process, there is a problem that foreign substances such as electrode powder are introduced into side surfaces of the electrode assembly. As a result, quality problems such as low voltage failure may occur due to the foreign substances introduced into the side surfaces of the electrode assembly.

DISCLOSURE OF THE INVENTION

Technical Problem

An object of the present invention is to provide an electrode assembly in which introduction of foreign substances and electrode powder into side surfaces of the electrode assembly is blocked to prevent low voltage failure from occurring, thereby improving quality, a secondary battery comprising the electrode assembly, a method for manufacturing the secondary battery, and a battery pack.

Technical Solution

An electrode assembly according to a first embodiment of the present invention for achieving the above object comprises: a radical unit in which electrodes and separators are alternately stacked, the radical unit having one electrode stacked at the uppermost end; and a separation sheet disposed at the uppermost end of the radical unit, wherein the separation sheet comprises: a separation part disposed at the uppermost end of the radical unit; and a pair of side surface protection parts, each of the pair of side surface protection parts connected to a side surface of the separation part and folded to contact a side portion of the radical unit to cover the side portion of the radical unit.

The side surface protection parts may adhere to side surfaces of each of the separators provided in the radical unit.

Adhesion between the side surface protection parts and the side surfaces of the separators may be less than adhesion between each of the electrodes and the separators in the radical unit.

The radical unit and the separation sheet may adhere to each other with adhesion less than adhesion between each of the electrodes and the separators in the radical unit, or are adjacent to each other without the adhesion.

The separation sheet may be made of a synthetic resin material. The electrode assembly may further comprise a fixing tape attached to surround the radical unit and the separation sheet.

The electrode assembly may further comprise an electrode disposed on the uppermost end of the separation sheet.

A cutoff line may be formed on a boundary between the separation part and each of the side surface protection parts.

The side surface protection part may have an area greater than that of the side surface of the radical unit.

A secondary battery according to a second embodiment of the present invention comprises: an electrode assembly; and a battery case configured to accommodate the electrode assembly, wherein the electrode assembly comprises: a radical unit in which a plurality of electrodes and a plurality of separators are alternately stacked, the radical unit one electrode stacked at the uppermost end; and a separation sheet disposed at the uppermost end side of the radical unit, wherein the separation sheet comprises:

a separation part disposed at the uppermost end of the radical unit; and a pair of side surface protection parts, each of the pair of side surface protection parts connected to a side surface of the separation part and folded to contact a side portion of the radical unit to cover the side surfaces of the radical unit.

A method for manufacturing the secondary battery according to the second embodiment of the present invention comprises: (alternately stacking a plurality of electrodes and a plurality of separators to manufacture a radical unit, wherein one electrode is stacked at an uppermost end of the radical unit; (cutting a separation film to manufacture a separation part having a size corresponding to each of the separators and a pair of side surface protection parts, each of the pair of side protection parts connected to a side surface of the separator to manufacture a separation sheet; locating the separation sheet at an uppermost end of the radical unit and folding the side surface protection parts with respect to the separation part and then locating the side surface protection parts on each side surface of the radical unit to manufacture an unfinished electrode assembly; pressing the uppermost end and a lowermost end of the unfinished electrode assembly at the same time to allow the separation sheet and the radical unit to adhere to each other; attaching a fixing tape to surround the unfinished electrode assembly and thereby to manufacture a finished electrode assembly; and accommodating the finished electrode assembly in a battery case and sealing an edge surface of the battery case to manufacture a finished secondary battery.

A battery pack according to a third embodiment of the present invention comprises: one or more secondary batteries; and a pack case configured to accommodate the one or more secondary batteries, wherein the secondary battery comprises: an electrode assembly; and a battery case configured to accommodate the electrode assembly, wherein the electrode assembly comprises: a radical unit in which a plurality of electrodes and a plurality of separators are alternately stacked, the radical unit having a structure in which one electrode is stacked at the uppermost end; and an auxiliary unit provided with a separation sheet disposed at the uppermost end side of the radical unit, wherein the separation sheet comprises: a separation part disposed at the uppermost end side of the radical unit; and a side surface protection part connected to each of side surfaces of the separation part and folded to contact a side portion of the radical unit to cover the side surfaces of the radical unit.

An electrode assembly according to a fourth embodiment of the present invention further comprises an electrode disposed at the uppermost end of a separation sheet of an auxiliary unit.

An electrode assembly according to a fifth embodiment of the present invention comprises a separation sheet, wherein the separation sheet further comprises a pair of bottom surface protection parts, each of the pair of bottom surface protection parts connected to a lower end surface of one of the side surface protection parts and folded t contact the lowermost end surface of the radical unit.

A portion or the whole of the bottom surface protection parts may adhere to the lowermost end surface of the radical unit.

The separation sheet may further comprise a surface protection part connected to each of both side surfaces of the side surface protection part and folded to contact each of front and rear sides of the radical unit.

An electrode assembly according to a sixth embodiment of the present invention comprises a side surface protection part, wherein the side surface protection part is cut from a separation part when the electrode assembly is accommodated in a battery case.

Advantageous Effects

The electrode assembly of the present invention may comprise the radical unit and the auxiliary unit. The auxiliary unit may comprise the separation sheet, and the separation sheet may comprise the separation part disposed at the uppermost end side of the radical unit and a side surface protection part covering the side portion of the radical unit. Thus, the introduction of the foreign substances and the electrode powder into the side surfaces of the radical unit may be blocked to prevent the low voltage failure from occurring, thereby improving the quality.

MODE FOR CARRYING OUT THE INVENTION

Figure 1:
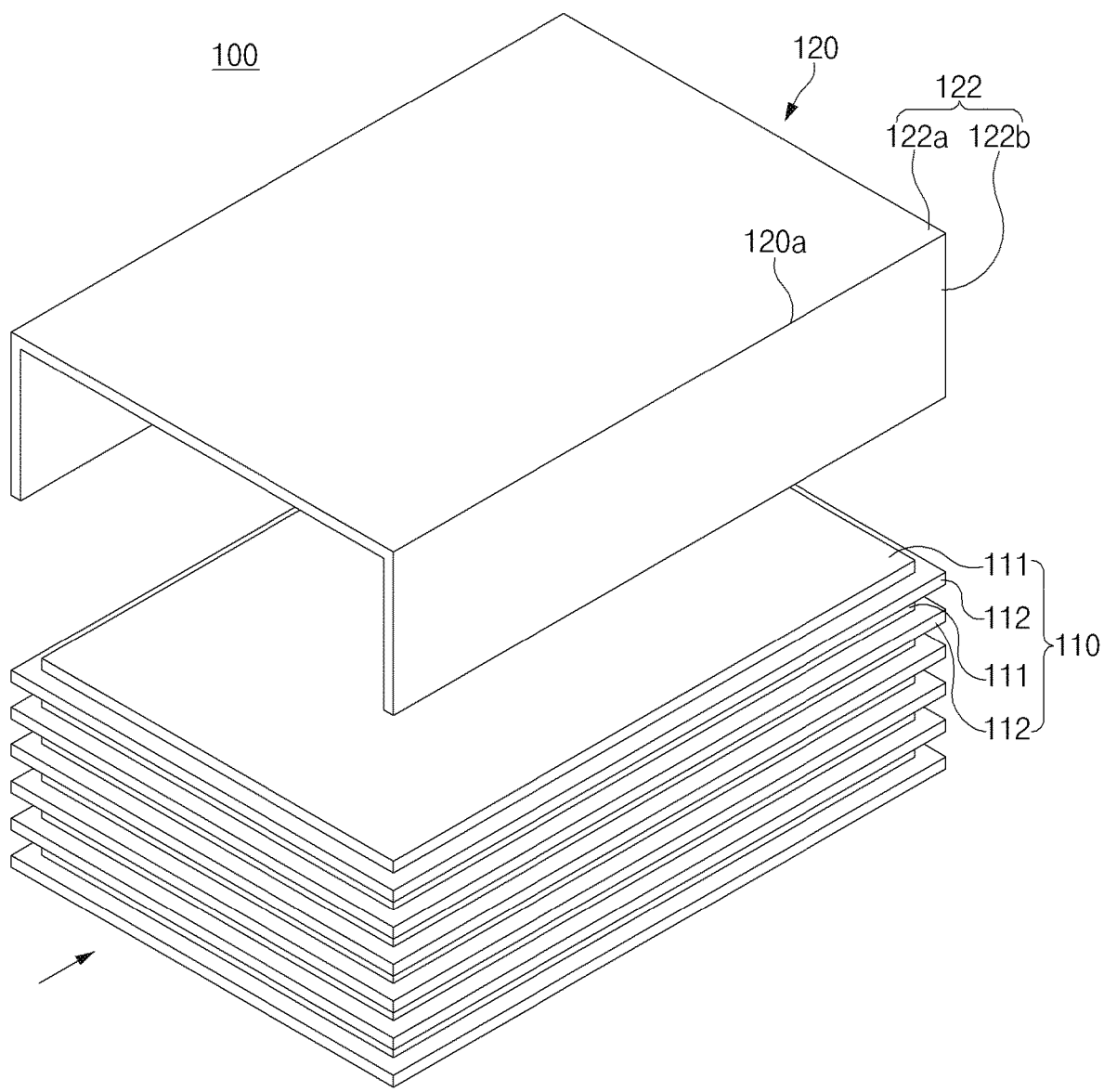
FIG. 1 is a perspective view of an electrode assembly according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Electrode Assembly According to First
Embodiment of the Present Invention

Figure 2:
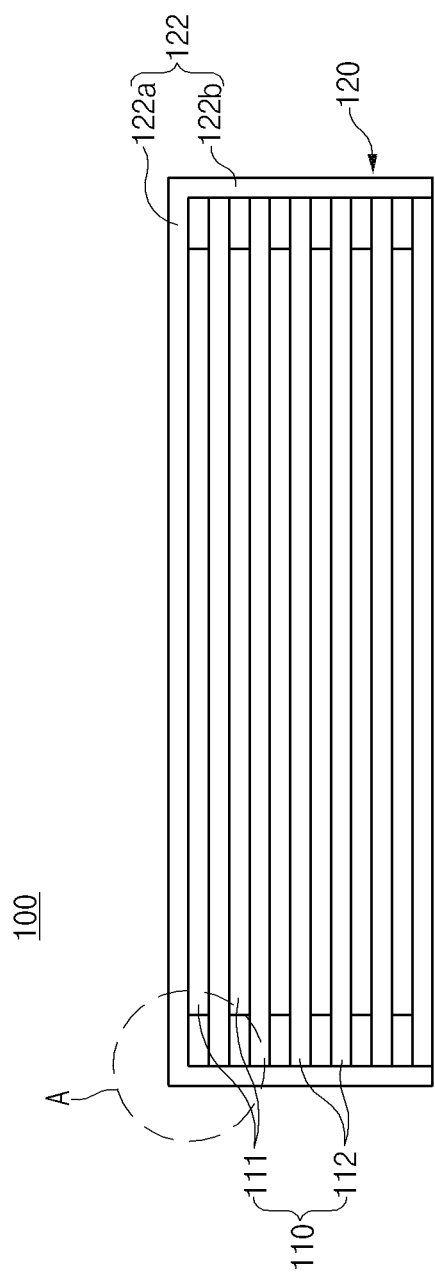
FIG. 2 is a side view of the electrode assembly according to the first embodiment of the present invention.
Figure 3:
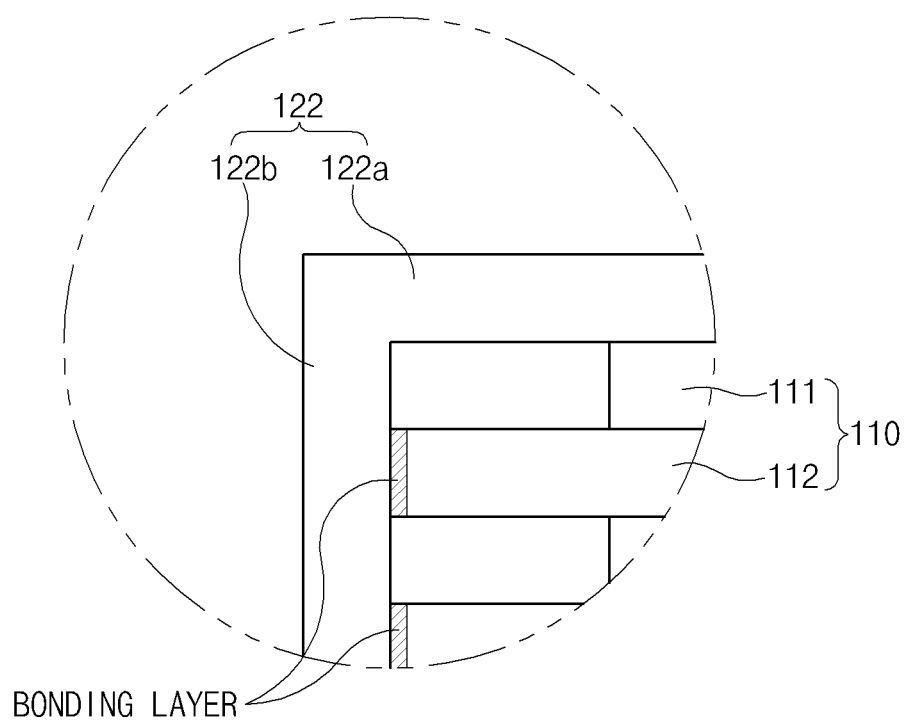
FIG. 3 is an enlarged view of a portion 'A' illustrated in FIG. 2.

As illustrated in FIGS. 1 to 3, an electrode assembly 100 according to a first embodiment of the present invention comprises a radical unit 110 and an auxiliary unit 120.

Radical Unit

In the radical unit has a structure, a plurality of electrodes 111 and a plurality of separators 112 are alternately stacked. Particularly, the radical unit 110 has a structure in which the electrode is stacked at the uppermost end.

That is, in the radical unit 110, the plurality of electrodes 111 and the plurality of separators 112 are alternately stacked in a vertical direction. Thus, the radical unit 110 has a structure in which the electrode 111 is stacked at the uppermost end, and the separator 112 is stacked at the lowermost end.

Here, the plurality of electrodes 111 comprise a first electrode and a second electrode. Thus, in the radical unit 110, a four-layered structure in which the first electrode, the separator, the second electrode, and the separator are stacked is stacked once or repeatedly stacked.

Each of the electrodes 111 comprises a collector and an electrode active material layer applied to both side surfaces of the collector.

Also, the first electrode may be a negative electrode, and the second electrode may be a positive electrode, and vice versa.

Auxiliary Unit

The auxiliary unit 120 comprises a separation sheet 122 disposed at the uppermost end side of the radical unit 110. The separation sheet 122 blocks introduction of foreign substances into the side surfaces of the radical unit 110 to prevent the side surfaces of the radical unit 110 from being contaminated.

For example, the separation sheet 122 comprises a separation part 122a disposed at the uppermost end side of the radical unit 110 and a side surface protection part 122b connected to each of side surfaces of the separation part 122a and folded to contact a side portion of the radical unit 110, thereby covering the side portion of the radical unit 110. That is, in the separation sheet 122, the separation part 122a is disposed at the uppermost end side of the radical unit 110 to protect the electrode disposed at the uppermost end of the radical unit 110, and the side surface protection part 122b is connected to each of both side surfaces of the separation part 122a. The side surface protection part 122b is folded toward each of the side surfaces of the radical unit 110 to block exposition of the side surfaces of the radical unit 110 to the outside.

Thus, the auxiliary unit 120 may prevent the foreign substances from being introduced into the side surfaces of the radical unit through the separation sheet 122, thereby preventing quality problems such as low voltage failures from occurring.

The separation sheet 122 may be made of an inexpensive material because the separation sheet 122 has only to blocks only the introduction of the foreign substances into the side surfaces of the radical unit 110. That is, the separation sheet 122 may be made of a synthetic resin material, particularly, a polyethylene terephthalate (PET) material to improve easy of purchase.

Particularly, the separation part 122a and the side surface protection part 122b are integrally formed to realize easy of manufacture and prevent the separation part 122a and the side surface protection part 122b from being separated from each other by an external impact.

As illustrated in FIG. 3, the side surface protection part 122b may adhere to a side surface of the separator 112 provided in the radical unit 110 to stably protect the side surface of the radical unit 110 through the side surface protection part 122b.

For example, heat is applied to an outer surface (a right surface when viewed in FIG. 3) of the side surface protection part 122b in a state in which a back surface (a left surface when viewed in FIG. 3) of the side surface protection part 122b and the side surface of the separator 112 provided in the radical unit 110 are in close contact with each other. As a result, the separator 112 and the side surface protection part 122b may adhere while a coating layer having adhesion force is melted. The separator 112 and the side surface protection part 122b may adhere to each other by using an adhesive to improve the adhesion force.

The adhesion force between the side surface protection part 122b and each of the side surfaces of the separator 112 may be less than that between the electrode 111 and the separator 112 in the radical unit 110. That is, when the adhesion force between the side surface protection part 122b and the side surface of the separator 112 is equal or greater than that between the electrode 111 and the separator 112 in the radical unit 110, the electrode 111 and the separator 112 may also be separated from each other when the side surface protection part 122b and the separator 112, which adhere to each other, are separated from each other, thereby causing product defects. That is to say, when the finished electrode assembly is manufactured, the side surface protection part 122b may be removed from the separation part 122a of the separation sheet 122 to improve electrolyte impregnation. Here, when the adhesion force between the side surface protection part 122b and the side surface of the separator 112 is equal to or greater than that between the electrode 111 and the separator 112 in the radical unit 110, the electrode 111 and the separator 112 may be also separated in the radical unit 110 to cause defects.

Thus, the adhesion force between the side surface protection part 122b and the side surface of the separator 112 may be less than that between the electrode 111 and the separator 112 in the radical unit 110. Thus, the side surface protection part 122b may be removed from the side surface of the separator 112 without separating the electrode 111 and the separator 112 in the radical unit 110.

The auxiliary unit 120 having the above-described configuration may allow a battery capacity to increases and also prevent the foreign substances from being introduced into the side surfaces.

The radical unit 110 and the separation sheet 122 of the auxiliary unit 120 may adhere to each other with adhesion force less than that between the electrode 111 and the separator 112 in the radical unit 110 or be adjacent to each other without the adhesion force. That is, when the radical unit 110 and the separation sheet 122 of the auxiliary unit 120, which are repeatedly stacked, are separated from each other, the electrode and the separator, which are provided in the radical unit 110, may be separated from each other in the radical unit due to a difference in adhesion force. For reference, the adhesion force may be expressed as peeling force. For example, the adhesion force between the electrode and the separator may be expressed as force required for separating the electrode and the separator from each other. In order to prevent this phenomenon, the radical unit 110 and the separation sheet 122 of the auxiliary unit 120 may adhere to each other with adhesive force less than that between the electrode 111 and the separator 112 or be adjacent to each other without the adhesion force. Thus, when the radical unit 110 and the separation sheet 122 of the auxiliary unit 120 are separated from each other, the electrode and the separator, which are provided in the radical unit, may be prevented from being separated from each other to previously prevent defects from occurring.

Fixing Tape

A fixing tape attached to surround the radical unit 110 and the auxiliary unit 120 may be further provided.

Figure 4:
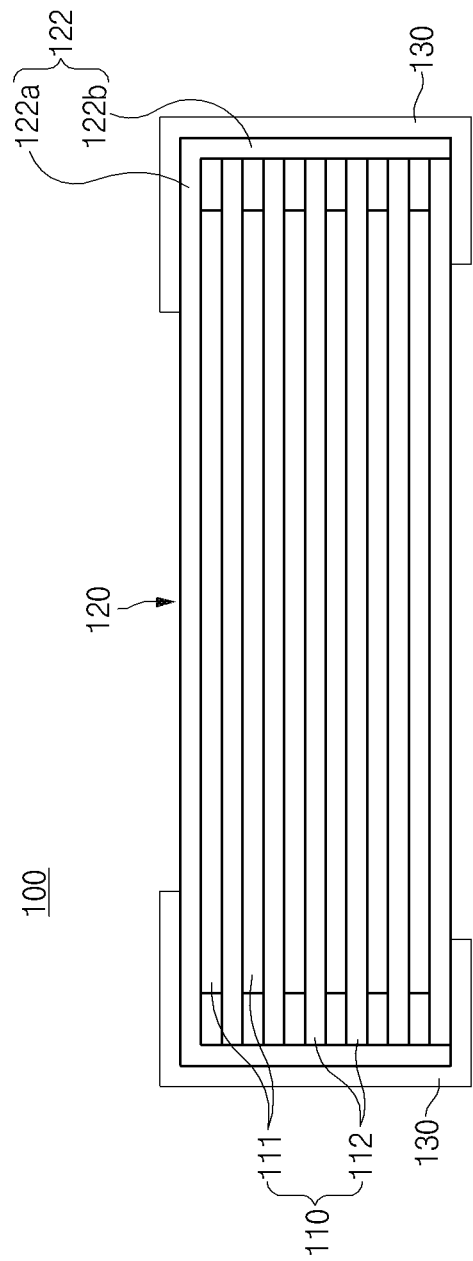
FIG. 4 is a side view of the electrode assembly to which a fixing tape is attached according to the first embodiment of the present invention.

That is, as illustrated in FIG. 4, the fixing tape 130 is attached to be connected to the separation sheet 122 of the auxiliary unit 120 and a bottom surface of the separator 112 disposed at the lowermost end of the radical unit 110. As a result, bonding between the radical unit 110 and the auxiliary unit may be improved, and also, attachment of the side surface protection part 122b of the separation sheet 122 provided in the auxiliary unit 120 may be improved.

The side surface protection part 122b may have an area greater than that of the side surface of the radical unit 110. Thus, even though a meandering defect occurs in the side surface protection part 122b, the side surface protection part 122b may stably cover the side surface of the radical unit 110.

A fine punching hole through which the foreign substances do not passes, but an electrolyte passes, may be formed in the side surface protection part 122b of the separation sheet 122. The penetrability of the electrolyte into the side surface of the electrode assembly 100 in which the side surface protection part 122b of the separation sheet 122 is provided may be improved by the punching hole, and thus, the impregnation of the electrolyte into the side surface of the electrode assembly 100 may be improved.

Thus, the electrode assembly 100 according to the first embodiment of the present invention comprises the auxiliary unit 120 provided with the separation sheet 122. Therefore, the introduction of the foreign substances into the side surface of the electrode assembly 100 may be prevented to previously prevent the defects from occurring.

Secondary Battery According to Second Embodiment of the Present Invention

Figure 5:
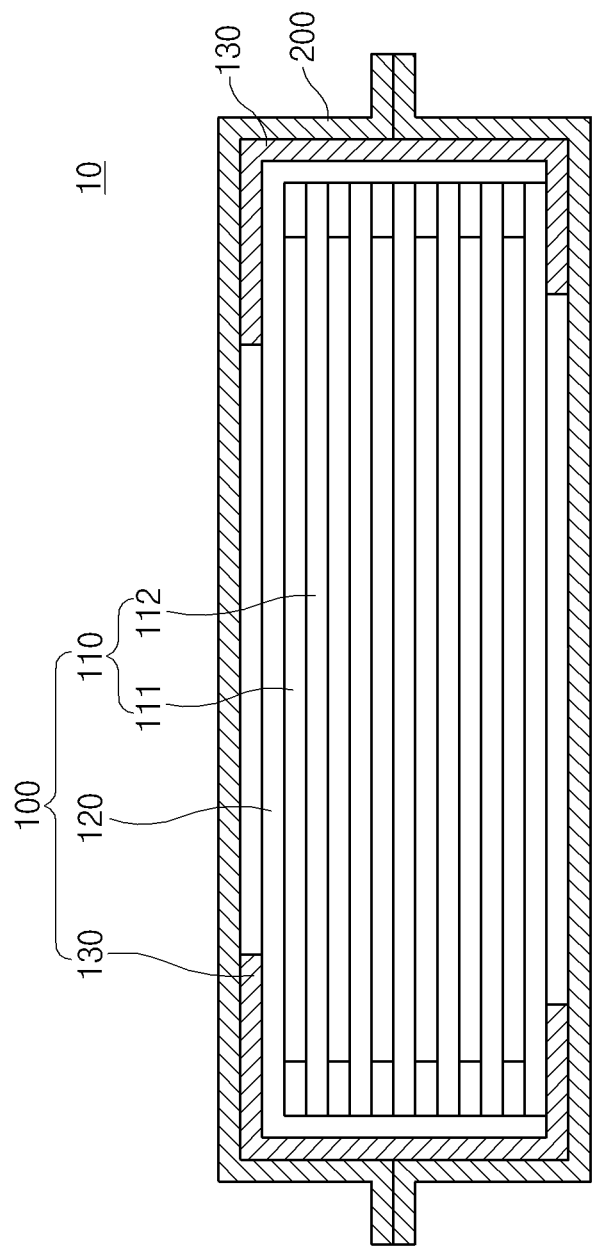
FIG. 5 is a cross-sectional view of a secondary battery according to a second embodiment of the present invention.

As illustrated in FIG. 5, a secondary battery 10 according to a second embodiment of the present invention comprises an electrode assembly 100 and a case 200 accommodating the electrode assembly 100.

Here, the electrode assembly 100 comprises a radical unit 110 having a structure, in which a plurality of electrodes 111 and a plurality of separators 112 are alternately stacked, and one electrode is stacked at the uppermost end, and an auxiliary unit 120 provided with a separation sheet 122 disposed at the uppermost end side of the radical unit 110.

Particularly, the separation sheet 122 comprises a separation part 122a disposed at the uppermost end side of the radical unit 110 and a side surface protection part 122b connected to each of side surfaces of the separation part 122a and folded to contact a side portion of the radical unit 110, thereby covering side surfaces of the radical unit 110.

The electrode assembly 100 has the same configuration and function as the above-described electrode assembly according to the first embodiment of the present invention, and thus, the same reference numerals are used, and duplicated descriptions are omitted.

Thus, the secondary battery 10 according to the second embodiment of the present invention comprises an electrode assembly 100 provided with a separation sheet 122. Thus, introduction of foreign substances into side surface of the electrode assembly 100 may be prevented to previously prevent defects from occurring, thereby improving commerciality. Particularly, the separation sheet 122 may protect the side surfaces of the electrode assembly 100 to prevent the side surfaces of the electrode assembly 100 from being damaged.

Figure 6:
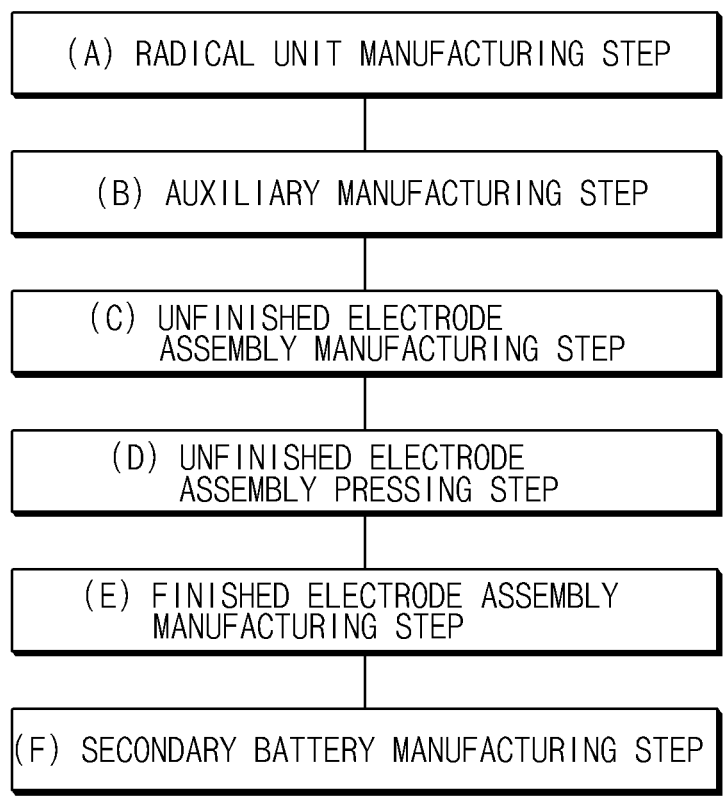
FIG. 6 is a flowchart illustrating a method for manufacturing the second battery according to the second embodiment of the present invention.

Method for Manufacturing Secondary Battery According to Second Embodiment of the Present Invention As illustrated in FIG. 6, a method for manufacturing a secondary battery according to a second embodiment of the present invention comprises (A) a radical unit manufacturing step, (B) an auxiliary manufacturing step, (C) an unfinished electrode assembly manufacturing step, (D) an unfinished electrode assembly pressing step, (E) a finished electrode assembly manufacturing step, and (F) a secondary battery manufacturing step.

(A) Radical Unit Manufacturing Step

Figure 7:
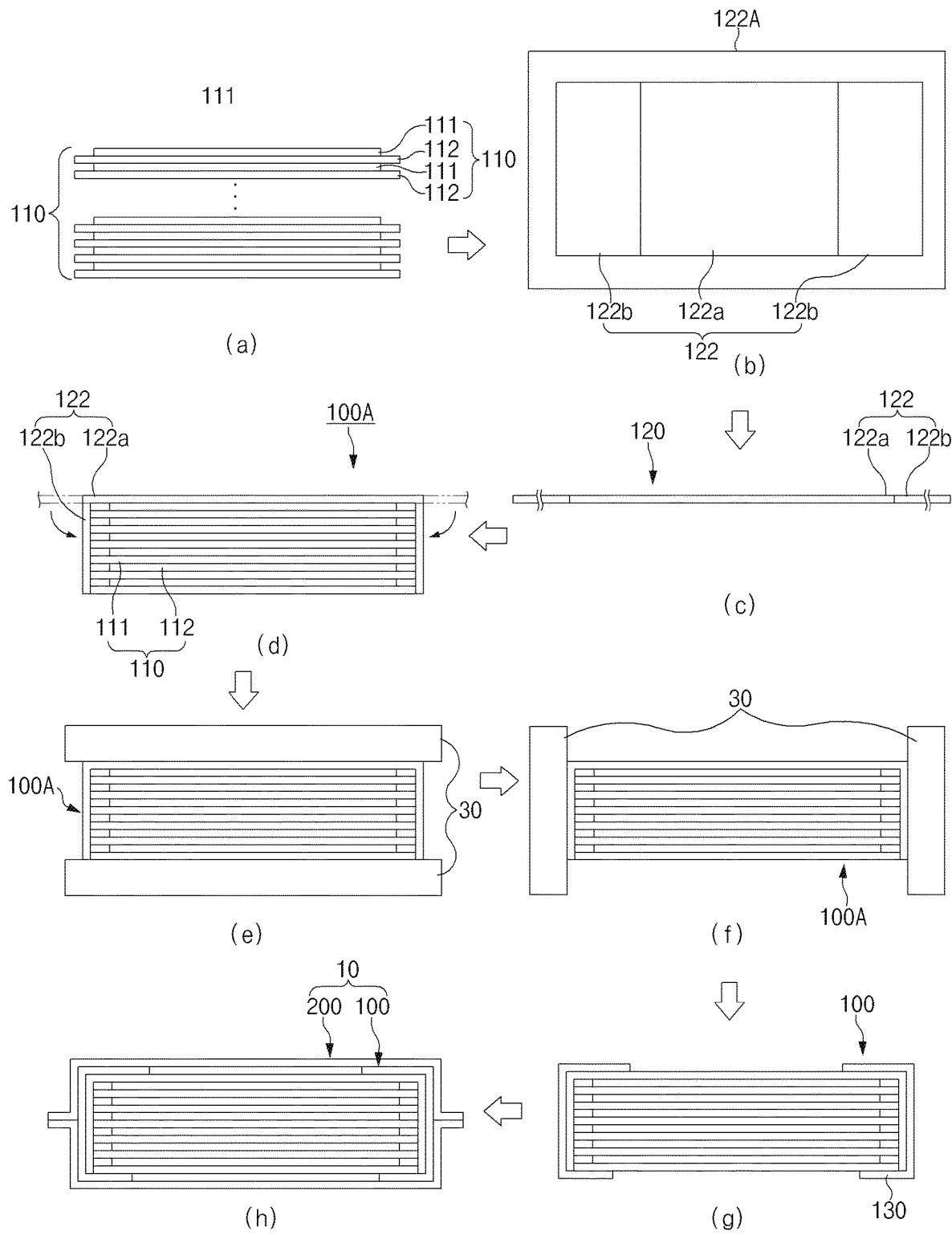
FIG. 7 is a process view illustrating the method for manufacturing the second battery according to the second embodiment of the present invention.

Referring to (a) of FIG. 7, in (A) the radical unit manufacturing step, a plurality of electrode 111 and a plurality of separators 112 are alternately stacked to manufacture a radical unit 110. Here, the radical unit 110 has a structure in which one electrode 111 is stacked at the uppermost end, and one separator 112 is stacked at the lowermost end. Here, the plurality of electrodes may be a negative electrode and a positive electrode.

That is, (A) the radical unit manufacturing step has a structure in which a four-layered structure comprising the negative electrode that is one electrode, the separator 112, the positive electrode that is the other electrode, and the separator 112 is stacked once or repeatedly stacked.

(B) Auxiliary Unit Manufacturing Step

Referring to (b) of FIG. 7, in (B) the auxiliary unit manufacturing step, a separation film 122A having a predetermined size is cut to manufacture a separation sheet 122 comprising a separation part 122a having a size corresponding to the separator 112 and a side surface protection part 122b connected to each of both side surfaces of the separation part 122a. Accordingly, the auxiliary unit 120 provided with the separation sheet 122 may be manufactured.

(C) Unfinished Electrode Assembly Manufacturing Step

Referring to (d) and (c) of FIG. 7, in (C) the unfinished electrode assembly manufacturing step, the separation part 122a of the auxiliary unit 120 are disposed at the uppermost end side of the radical unit 110. Next, after being folded along a boundary between the separation part 122a and the side surface protection part 122b, the side surface protection part 122b is disposed to contact a side surface of the radical unit 110 to manufacture an unfinished electrode assembly 100A.

(D) Unfinished Electrode Assembly Pressing Step

Referring to (e) of FIG. 7, in (D) the unfinished electrode assembly pressing step, the uppermost end and the lowermost end of the unfinished electrode assembly 100A are pressed using a pressing device 30 to bond the radical unit 110 and the auxiliary unit 120, which are provided in the unfinished electrode assembly 100A, to each other.

Here, the radical unit 110 and the auxiliary unit 120 adhere to each other with adhesion force less than that between the electrode 111 and the separator in the radical unit 110.

Referring to (f) of FIG. 7, the (D) unfinished electrode assembly pressing step further comprises a process of allowing the side surface protection part 122b and the side surface of the separator 112 to adhere to each other. That is, when the pressing of the unfinished electrode assembly 100A is completed, a left end and a right end of the unfinished electrode assembly 100A are pressed using the pressing device 30 to allow the side surface protection part 122b and the side surface of the separator 112, which are folded with respect to each other, to adhere to each other.

Here, adhesion force between the side surface protection part 122b and the side surface of the separator 112 is less than that between the electrode 111 and the separator 112 in the radical unit 110.

(E) Finished Electrode Assembly Manufacturing Step

Referring to (g) of FIG. 7, in the finished electrode assembly manufacturing step, a fixing tape 130 is attached to surround the unfinished electrode assembly, thereby manufacturing a finished electrode assembly 100. That is, in the finished electrode assembly manufacturing step, one end of the fixing tape 130 is attached to the separation part 122a of the separation sheet 122 of the auxiliary unit 120, and the other end of the fixing tape 120 is attached to a bottom surface of the separator 112 disposed at the lowermost end of the radical unit 110 via the side surface protection part 122b of the separation sheet 122. Here, the fixing tape 130 is attached to both side surfaces of the unfinished electrode assembly.

(F) Secondary Battery Manufacturing Step

Referring to (h) of FIG. 7, in (F) the secondary battery manufacturing step, the finished electrode assembly 100 and an electrolyte (not shown) are accommodated in a case 200, and then, an edge surface of the case 200 is sealed to manufacture a finished secondary battery 10.

Electrode Pack According to Third Embodiment of the Present Invention

Figure 8:
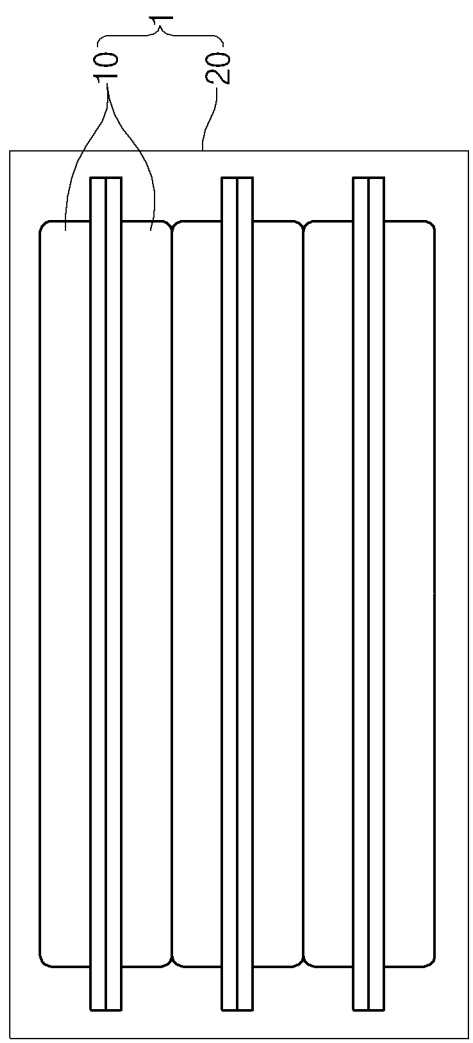
FIG. 8 is a schematic side view of a battery pack according to a third embodiment of the present invention.

As illustrated in FIG. 8, a battery pack 1 according to a third embodiment of the present invention comprises one or more secondary batteries 10 and a pack case 20 accommodating the one or more secondary batteries 10. Each of the secondary batteries 10 comprises an electrode assembly 100 and a case 200 accommodating the electrode assembly 100.

Also, the electrode assembly 100 comprises a radical unit 110 having a structure, in which a plurality of electrodes 111 and a separators 112 are alternately stacked, and one electrode 111 is stacked at the uppermost end, and an auxiliary unit provided with a separation sheet 122 disposed at the uppermost end side of the radical unit 110. The separation sheet 122 comprises a separation part 122a disposed at the uppermost end side of the radical unit 110 and a side surface protection part 122b connected to a side surface of the separation part 122a and folded to contact a side portion of the radical unit 110 to cover the side portion of the radical unit 110.

The secondary battery 10 has the same configuration and function as the above-described secondary battery according to the second embodiment of the present invention, and thus, the same reference numerals are used for the same configuration, and duplicated descriptions are omitted.

Thus, the battery pack 1 according to the third embodiment of the present invention comprises the secondary battery 10 provided with the separation sheet to significantly reduce a defective rate.

Electrode Assembly According to Fourth Embodiment of the Present Invention

Figure 9:
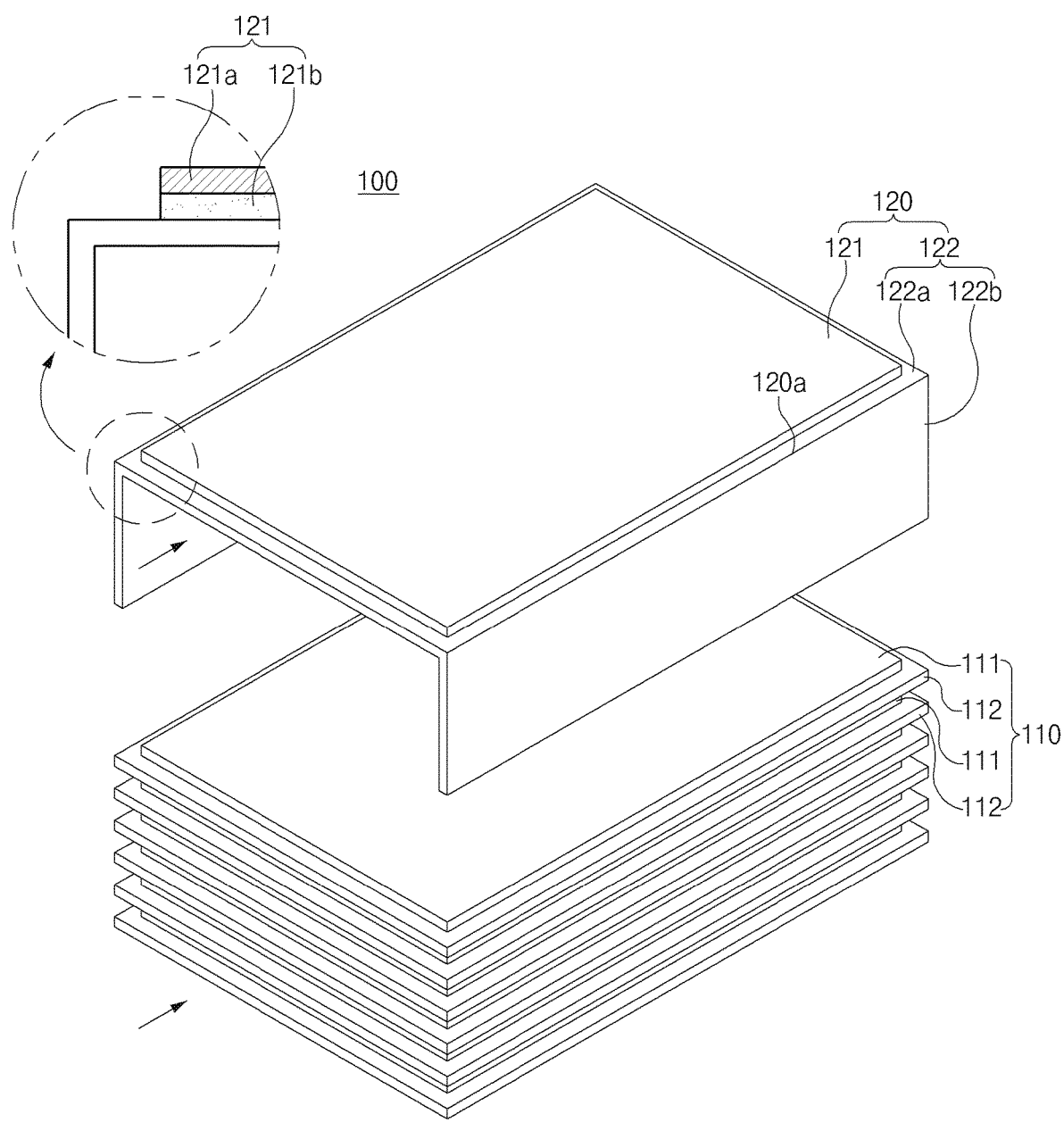
FIG. 9 is a cross-sectional view illustrating an auxiliary unit of an electrode assembly according to a fourth embodiment of the present invention.

As illustrated in FIG. 9, an electrode assembly 100 according to a fourth embodiment of the present invention comprises an auxiliary unit 120 provided with a separation sheet 122 disposed at the uppermost end side of the radical unit 110.

Here, the separation sheet 122 comprises a separation part 122a disposed at the uppermost end side of the radical unit 110 and a side surface protection part 122b connected to each of side surfaces of the separation part 122a and folded to contact a side portion of the radical unit 110, thereby covering the side portion of the radical unit 110.

Particularly, the separator sheet 122 is made of the same material as the separator 112 provided in the radical unit 110.

The auxiliary unit 120 may further comprise an electrode 121 disposed at the uppermost end side of the separation sheet 122.

That is, the auxiliary unit 120 has a structure in which the electrode 121 and the separation sheet 122 are alternately stacked in a vertical direction. The auxiliary unit 120 in which the electrode 121 and the separation sheet 122 are stacked vertically is stacked on a top surface side of the electrode 111 disposed at the uppermost end side of the radical unit 110.

Here, the electrode 121 of the auxiliary unit 120 and the electrode 111 disposed at the uppermost end of the radical unit 110 have different polarities. That is, when the electrode 111 disposed at the uppermost end of the radical unit 110 is a first electrode, the electrode 121 of the auxiliary unit 120 may be a second electrode. On the other hand, when the electrode 111 disposed at the uppermost end of the radical unit 110 is a second electrode, the electrode 121 of the auxiliary unit 120 may be a first electrode.

For example, the separation sheet 122 comprises a separation part 122a disposed at the uppermost end side of the radical unit 110 and a side surface protection part 122b connected to each of side surfaces of the separation part 122a and folded to contact a side portion of the radical unit 110, thereby covering the side portion of the radical unit 110. That is, in the separation sheet 122, the separation part 122a is disposed at the uppermost end side of the radical unit 110 to separate the electrode 121 of the auxiliary unit 120 from the electrode 111 disposed at the uppermost end of the radical unit 110 and connect the side surface protection part 122b to each of both side surfaces of the separation part 122a. Here, the side surface protection part 122b is folded toward the side surface of the radical unit 110 to prevent the side surface of the radical unit 110 from being exposed to the outside.

Thus, the electrode assembly 100 according to the fourth embodiment of the present invention may block the introduction of the foreign matter into the side surface and simultaneously secure a large battery capacity.

The electrode 121 has a structure in which an electrode active material layer is provided only on one surface facing the separation sheet 122. That is, the electrode 121 comprises an electrode collector 121a and an electrode active material layer 121b applied to an inner surface (a bottom surface of the electrode collector when viewed in FIG. 9) of the electrode collector 121a, which faces the separation sheet 122.

Therefore, the electrode assembly 100 according to the fourth embodiment of the present invention may prevent the electrode active material layer from being unnecessarily wasted, thereby significantly reducing costs.

Electrode Assembly According to Fifth Embodiment of the Present Invention

Figure 10:
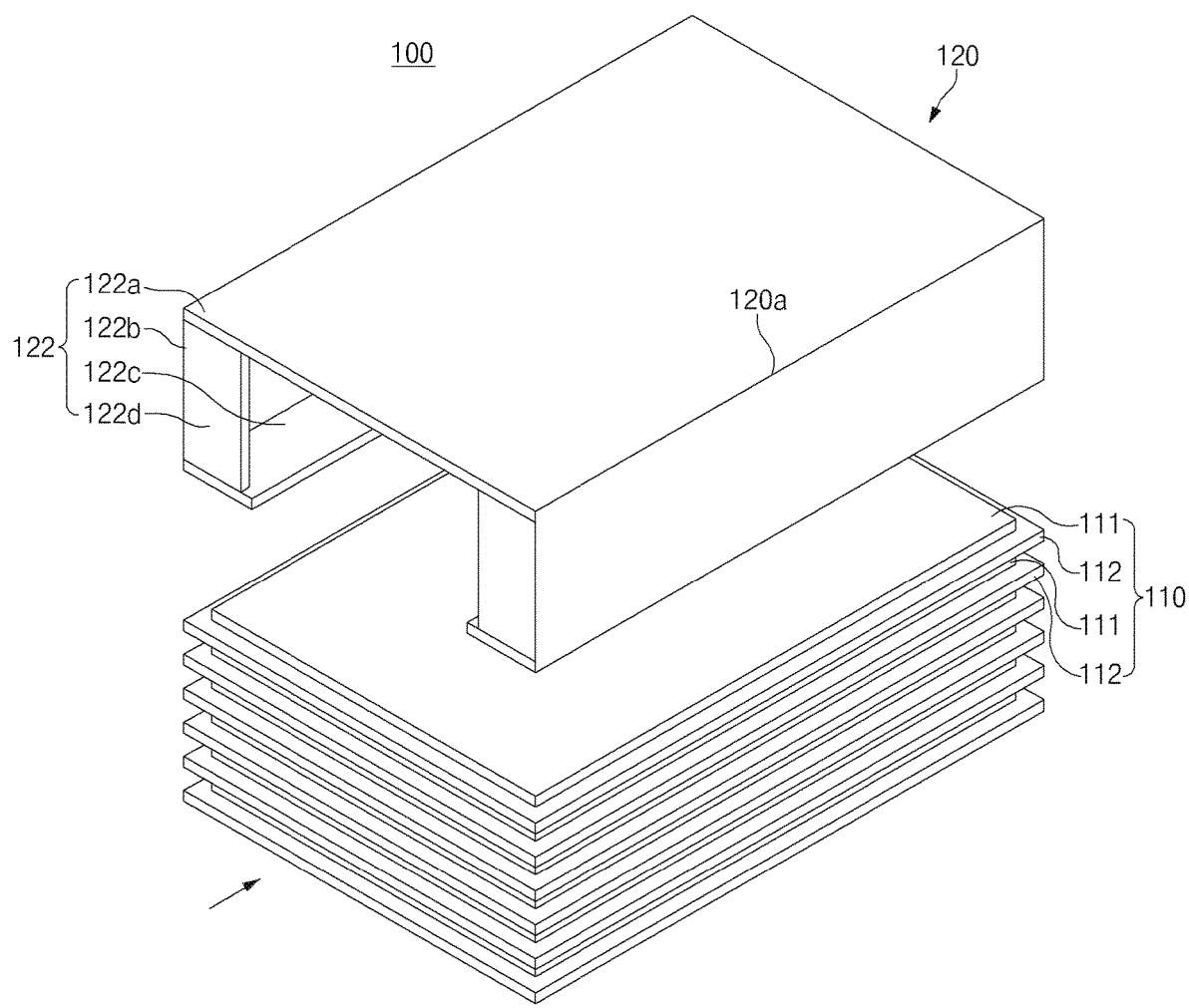
FIG. 10 is a perspective view of an electrode assembly according to a fifth embodiment of the present invention.
Figure 11:
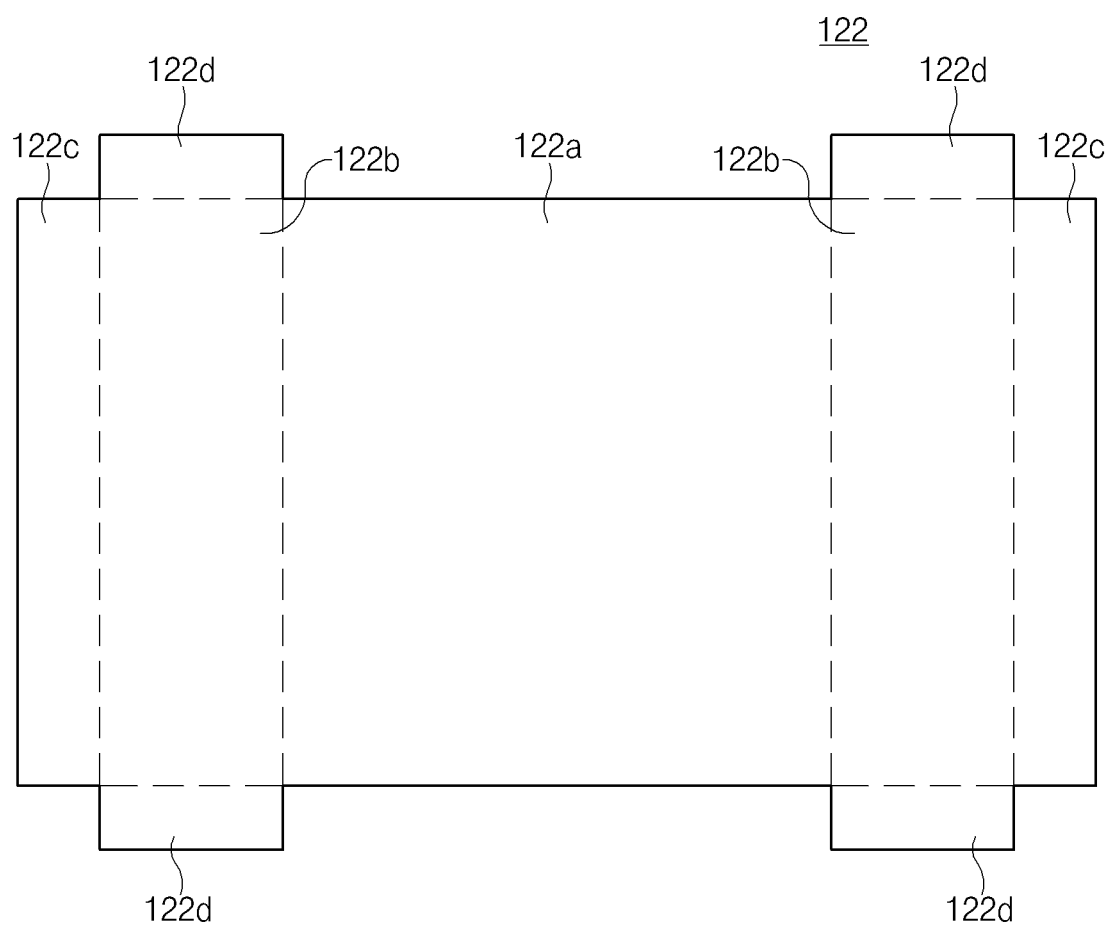
FIG. 11 is a development view of a separation sheet of FIG. 10.
Figure 12:
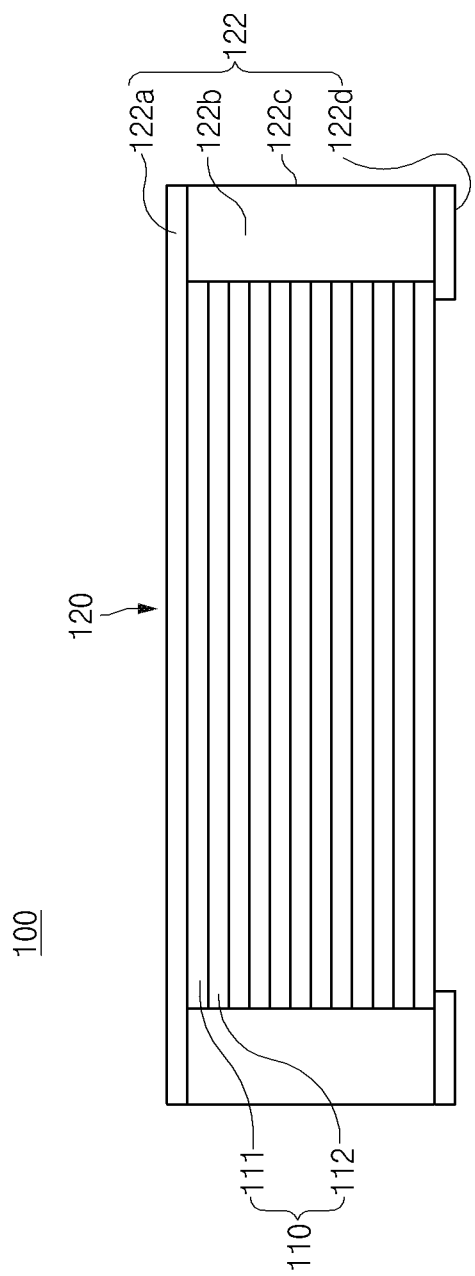
FIG. 12 is a front view of FIG. 10.

As illustrated in FIGS. 10 to 12, an electrode assembly 100 according to a fifth embodiment of the present invention comprises a radical unit 110 and an auxiliary unit 120. The auxiliary unit 120 comprises a separation sheet 122, and the separation sheet 122 is disposed at the uppermost end side of the radical unit 110.

For example, the separation sheet 122 comprises a separation part 122a disposed at the uppermost end side of the radical unit 110 and a side surface protection part 122b connected to each of side surfaces of the separation part 122a and folded to contact a side portion of the radical unit 110, thereby covering the side portion of the radical unit 110.

The separation sheet 122 further comprises a bottom surface protection part 122c connected to a lower end surface of the side surface protection part 122b and folded to contact the lowermost end surface of the radical unit 110 to prevent foreign substances from being introduced between the lowermost end surface of the radical unit 110 and the side surface protection part 122b through the bottom surface protection part 122c.

Particularly, a portion or the whole of the bottom surface protection part 122c may adhere to the lowermost end surface of the radical unit 110. Thus, fixing force of the separation sheet 122 may increase to improve adhesion between the side surface protection part 122b and the separator 112 of the radical unit 110.

The separation sheet 122 further comprises a surface protection part 122d connected to each of both side surfaces (front and rear surfaces of the side surface protection part when viewed in FIG. 10) of the side surface protection part 122b and folded to contact each of front and rear surfaces of the radical unit 110 to effectively prevent the foreign substances introduced into the front and rear surfaces of the radical unit 110 through the surface protection part 122d.

In summary, referring to FIG. 11, the separation sheet 122 comprises the separation part 122a, the side surface protection part 122b provided on each of both side surfaces of the separation part 122a, the bottom surface protection part 122c provided on each of both side surfaces of the side surface protection part 122b, and the surface protection part 122d provided on each of the front and rear surfaces of the side surface protection part 122b.

Therefore, the electrode assembly 100 according to the fifth embodiment of the present invention may prevent the foreign substances from being introduced into the front and rear sides as well as the side surfaces of the electrode assembly.

Electrode Assembly According to Sixth Embodiment of the Present Invention

Figure 13:
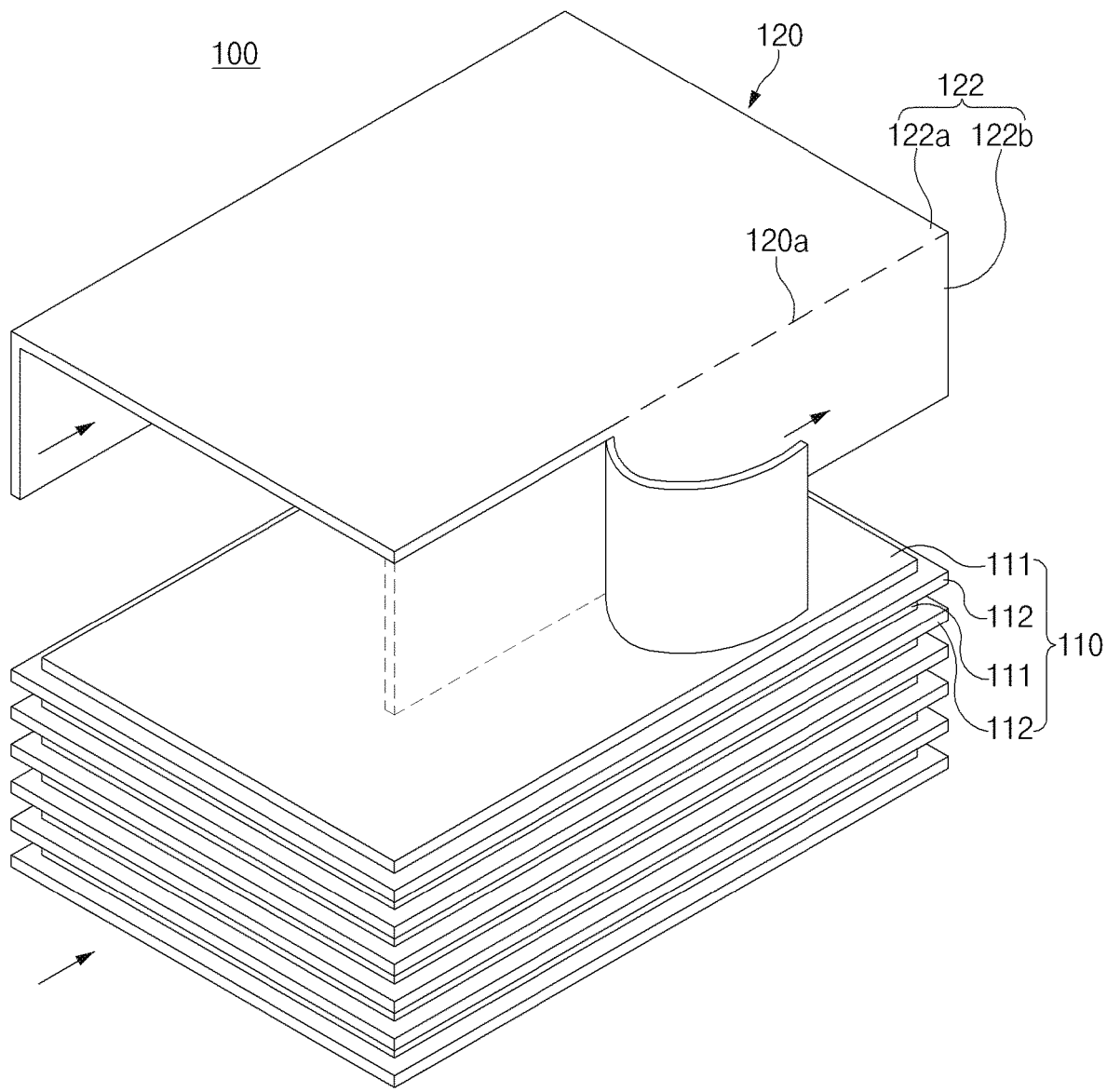
FIG. 13 is a perspective view of an electrode assembly according to a sixth embodiment of the present invention.

As illustrated in FIG. 13, in an electrode assembly 100 according to a sixth embodiment of the present invention, a separation sheet 122 comprises a separation part 122a and a side surface protection part 122b. When the electrode assembly is completely manufactured, the side surface protection part may be removed from the separation part 122a. As a result, side surfaces of the electrode 100 may be opened to improve impregnation of the electrode assembly 100 and the electrolyte when the secondary battery is manufactured.

That is, since a large amount of foreign substances are generated when the electrode assembly is manufactured, the side surfaces of the electrode assembly 100 may be protected through the side surface protection part 122b of the separation sheet 122, and when the electrode assembly 100 is completely manufactured, the side surface protection part 122b of the separation sheet 122 may be removed to open the side surfaces of the electrode assembly 100.

As illustrated in FIG. 13, a cutoff line 120a may be formed on a boundary between the separation part 122a and the side surface protection part 122b, and thus, the side surface protection part 122b may be easily cut along the cutoff line 120a.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. An electrode assembly comprising:
a radical unit in which electrodes and separators are alternately stacked, the radical unit having one electrode stacked at an uppermost end; and
a separation sheet disposed at the uppermost end of the radical unit,
wherein the separation sheet comprises:
a separation part disposed at the uppermost end of the radical unit;
a pair of side surface protection parts, each of the pair of side surface protection parts connected to a side surface of the separation part and folded to contact a side portion of the radical unit to cover the side portion of the radical unit;
a pair of bottom surface protection parts, each of the pair of bottom surface protection parts connected to a lower end surface of one of the side surface protection parts and folded to contact a lowermost end surface of the radical unit, and
a punching hole through which foreign substances do not pass, but an electrolyte passes, in at least one of the pair of side surface protection parts of the separation sheet,
wherein the separation part has a width extending between the pair of side surface protection parts,
wherein a combined width of the pair of bottom surface protection parts is less than half the width of the separation part,
wherein the pair of side surface protection parts adhere to side surfaces of each of the separators provided in the radical unit, and
wherein adhesion between the pair of side surface protection parts and the side surfaces of the separators is less than adhesion between each of the electrodes and the separators in the radical unit.

2. The electrode assembly of claim 1, wherein the radical unit and the separation sheet adhere to each other with adhesion less than adhesion between each of the electrodes and the separators in the radical unit, or are adjacent to each other without the adhesion.

3. The electrode assembly of claim 1, wherein a portion or the whole of the bottom surface protection parts adhere to the lowermost end surface of the radical unit.

4. The electrode assembly of claim 1, wherein the separation sheet further comprises a surface protection part connected to each side surface of each of the side surface protection parts and folded to contact front and rear sides of the radical unit.

5. The electrode assembly of claim 4, wherein the surface protection parts include a first pair of surface protection parts connected to a front edge of the pair of side surface protection parts, respectively,
wherein each of the first pair of surface protection parts has a first edge connected to the front edge of one of the pair of side surface protection parts and a second edge opposite the first edge, and
wherein the second edges of the pair of surface protection parts are spaced from each other.

6. The electrode assembly of claim 5, wherein the surface protection parts include a second pair of surface protection parts connected to a rear edge of the pair of side surface protection parts, respectively.

7. The electrode assembly of claim 1, wherein the separation sheet is made of a synthetic resin material.

8. The electrode assembly of claim 1, further comprising a fixing tape attached to surround the radical unit and the separation sheet.

9. The electrode assembly of claim 1, further comprising an electrode disposed on a first side of the separation sheet, the radical unit being on a second side of the separation sheet opposite the first side.

10. The electrode assembly of claim 1, wherein a cutoff line is formed on a boundary between the separation part and each of the side surface protection parts.

11. The electrode assembly of claim 1, wherein the separation sheet directly contacts the radical unit.

12. The electrode assembly of claim 1, wherein the width and a length of the separation sheet is larger than a width and a length of the radical unit.

13. A secondary battery comprising:
an electrode assembly; and
a battery case configured to accommodate the electrode assembly,
wherein the electrode assembly comprises:

a radical unit in which electrodes and separators are alternately stacked, the radical unit having one electrode stacked at the uppermost end; and a separation sheet disposed at the uppermost end of the radical unit, wherein the separation sheet comprises:

a separation part disposed at the uppermost end of the radical unit;

a pair of side surface protection parts, each of the pair of side surface protection parts connected to a side surface of the separation part and folded to contact a side portion of the radical unit to cover the side surfaces of the radical unit;

a pair of bottom surface protection parts, each of the pair of bottom surface protection parts connected to a lower end surface of one of the side surface protection parts and folded to contact a lowermost end surface of the radical unit; and a punching hole through which foreign substances do not pass, but an electrolyte passes, in at least one of the pair of side surface protection parts of the separation sheet, wherein the separation part has a width extending between the pair of side surface protection parts, wherein a combined width of the pair of bottom surface protection parts is less than half the width of the separation part, wherein the pair of side surface protection parts adhere to side surfaces of each of the separators provided in the radical unit, and wherein adhesion between the pair of side surface protection parts and the side surfaces of the separators is less than adhesion between each of the electrodes and the separators in the radical unit.

14. The secondary battery of claim 13, wherein the side surface protection part is cut from the separation part when the electrode assembly is accommodated in the battery case.

15. A method for manufacturing a secondary battery, the method comprising:

alternately stacking electrodes and separators to manufacture a radical unit, wherein one electrode is stacked at an uppermost end of the radical unit;

cutting a separation film to manufacture a separation part having a size corresponding to each of the separators and a pair of side surface protection parts, each of the pair of side surface protection parts connected to a side surface of the separator to manufacture a separation sheet;

locating the separation sheet at an uppermost end of the radical unit and folding the side surface protection parts with respect to the separation part and then locating the side surface protection parts on each side surface of the radical unit to manufacture an unfinished electrode assembly;

pressing the uppermost end and a lowermost end of the unfinished electrode assembly at the same time to allow the separation sheet and the radical unit to adhere to each other;

attaching a fixing tape to surround the unfinished electrode assembly and thereby to manufacture a finished electrode assembly;

accommodating the finished electrode assembly in a battery case and sealing an edge surface of the battery case to manufacture a finished secondary battery:

adhering the pair of side surface protection parts to side surfaces of each of the separators provided in the radical unit; and forming a punching hole through which foreign substances do not pass, but an electrolyte passes, in at least one of the pair of side surface protection parts of the separation sheet, wherein adhesion between the pair of side surface protection parts and the side surfaces of the separators is less than adhesion between each of the electrodes and the separators in the radical unit.

* * * * *